United States Patent
Guevara et al.

(10) Patent No.: US 6,519,324 B1
(45) Date of Patent: Feb. 11, 2003

(54) METHOD FOR RECOVERING EMERGENCY CALLS AT AN OPERATOR STATION DURING A POSITION FAILURE

(75) Inventors: Joseph Maurice Guevara, Oak Park, IL (US); Nina Simone Mitchell, Schaumburg, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/548,548

(22) Filed: Apr. 13, 2000

(51) Int. Cl.$^7$ ............................................. H04M 11/04
(52) U.S. Cl. ..................... 379/45; 379/49; 379/265.01
(58) Field of Search .......................... 379/45, 49, 279, 379/265.01, 266.02, 46

(56) References Cited

U.S. PATENT DOCUMENTS

| | | | | |
|---|---|---|---|---|
| 3,662,112 A | * | 5/1972 | Martin ....................... 340/506 |
| 5,311,569 A | * | 5/1994 | Brozovich et al. ...... 379/207.15 |
| 5,454,025 A | * | 9/1995 | Mulrow et al. ......... 379/221.03 |
| 6,327,342 B1 | * | 12/2001 | Mobley et al. ................ 379/37 |

* cited by examiner

Primary Examiner—Ahmad F. Matar
Assistant Examiner—Rasha S AL-Aubaidi
(74) Attorney, Agent, or Firm—Jenner & Block LLC

(57) ABSTRACT

A call is received at an operator station (200). If a position failure occurs at the operator station, the position failure is detected (204). A determination is made as to whether the call is an emergency call (206) by, for example, examining the sequence of called digits. If the call is designated as an emergency call, then a determination is made as to status of the call. Based on the status of the call, a connection is established with an alternate operator station without dropping the call to the caller.

32 Claims, 3 Drawing Sheets

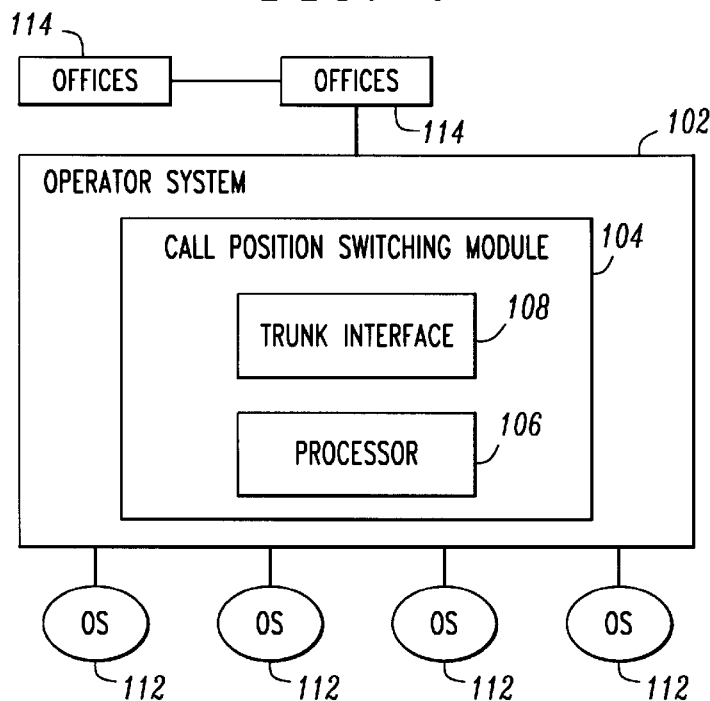
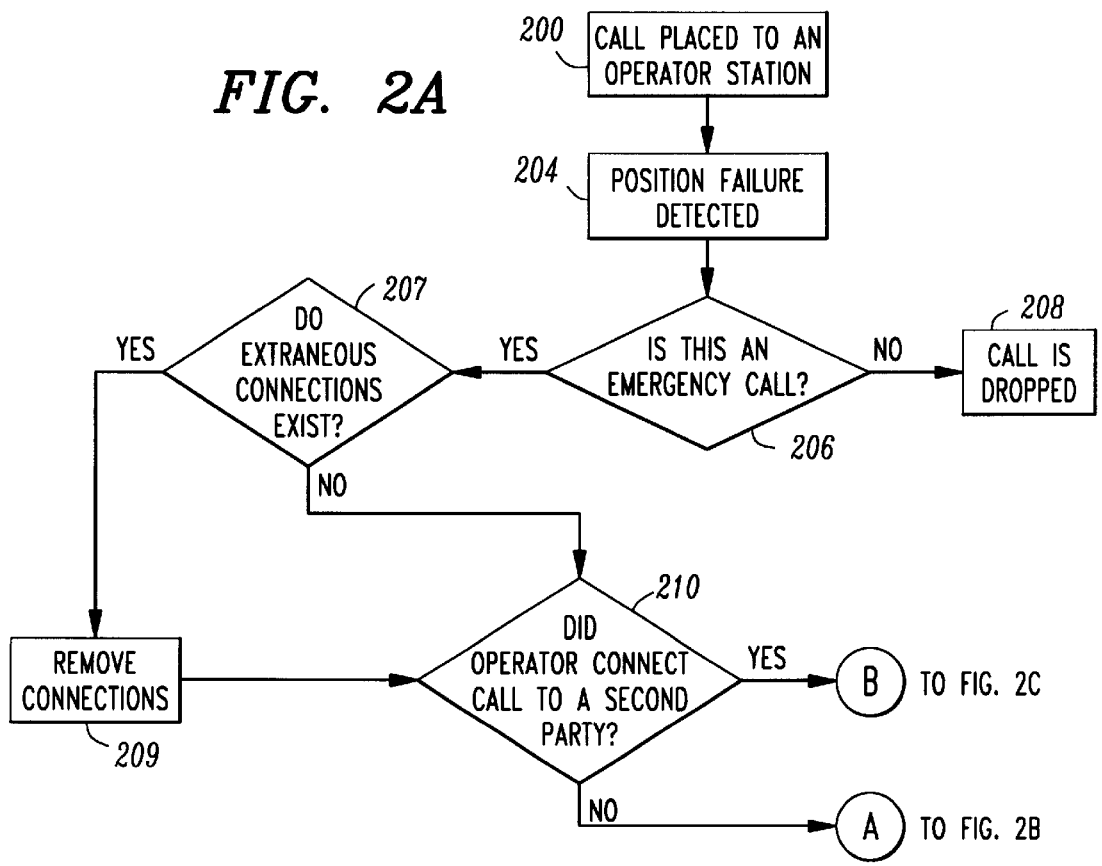

METHOD FOR RECOVERING EMERGENCY CALLS AT AN OPERATOR STATION DURING A POSITION FAILURE

FIELD OF THE INVENTION

The present invention relates generally to telephone switching systems, and in particular, to a method for recovering emergency calls in a switching system at an operator station during an operator position failure.

BACKGROUND OF THE INVENTION

The public telephone network is designed to provide assistance to callers in emergency situations. The public telephone network has specialized switching equipment to route emergency calls to a regional center of operators who process the calls and initiate the dispatch of services needed in an emergency. Emergency calls are typically initiated by dialing a special number. Then, the operator connects the call to an emergency authority. The emergency authority handles the dispatch of emergency units such as the paramedics, police and firefighters. The operator typically remains on the call until the emergency authority tells the operator to release the call.

Telephone switching systems are known to monitor the integrity of the switching system and associated resources. The switching systems periodically perform a battery of tests to detect position failures at operator stations or other errors within the switching system. For example, switching systems typically detect system failures when an operator has no functionality at the operator station, when communication links or trunks are malfunctioning, or when there is a hardware failure with a switching module. However, the switching system is not equipped to retrieve and reconnect emergency calls that were connected to the operator stations at the time of the position failures.

In existing switching systems, if a position failure occurs while an emergency call is at the operator station, the operator is logged out and the call is lost or dropped and the operator position is gradually torn down (i.e., data structures associated with the operator position are cleanly eliminated). This can occur before or after the operator connects to the emergency authority. Presently, there is no established method to recover emergency calls at failed positions. Of course, this is not desirable due to the importance of any single emergency call.

Therefore, a need exists for a method to recover emergency calls at an operator station during a position failure.

SUMMARY OF THE INVENTION

A method is provided for recovering emergency calls at an operator station during a position failure. First, an operator station receives a call. After receipt of the call, if a position failure occurs at the operator station, the position failure is detected. Then, a determination is made as to whether the call is an emergency call. For example, the sequence of called digits is compared to a predetermined sequence of digits to determine if the call is an emergency. If the call is an emergency call, then a determination is made as to the status of the call. The status of the call includes determining whether the call has any extraneous connections, whether the operator connected the call to an emergency authority, whether the call is active or on hold, and whether the call is at subscriber initiated or operator initiated. Based on the status of the call, the call is connected to an available operator station by performing a call transfer, a float, a one-party recall, or a two-party recall.

A system for recovering emergency telephone calls includes a first operator station, a second operator station and a switching system. The switching system is coupled to the first operator station and the second operator station. The first operator station receives calls. The switching system monitors the status of the first operator station. If the switching system detects a failure with the first operator station, the switching system determines whether the calls connected to the first operator station are emergency calls. If the calls are emergency calls, then the switching system determines a status of the calls and connects the calls to the available second operator station. By reconnecting emergency calls at a failed first operator station with an available second operator station, emergency calls are not disconnected from a caller and emergency calls are handled expediently.

BRIEF DESCRIPTION OF THE DRAWINGS

FIG. 1 is a block diagram of a telephone switching network in accordance with the present invention FIGS. 2A–C are flow charts illustrating a method to recover emergency calls at an operator station during a position failure in accordance with the present invention.

DETAILED DESCRIPTION OF THE PREFERRED EMBODIMENTS

Figure 2B:
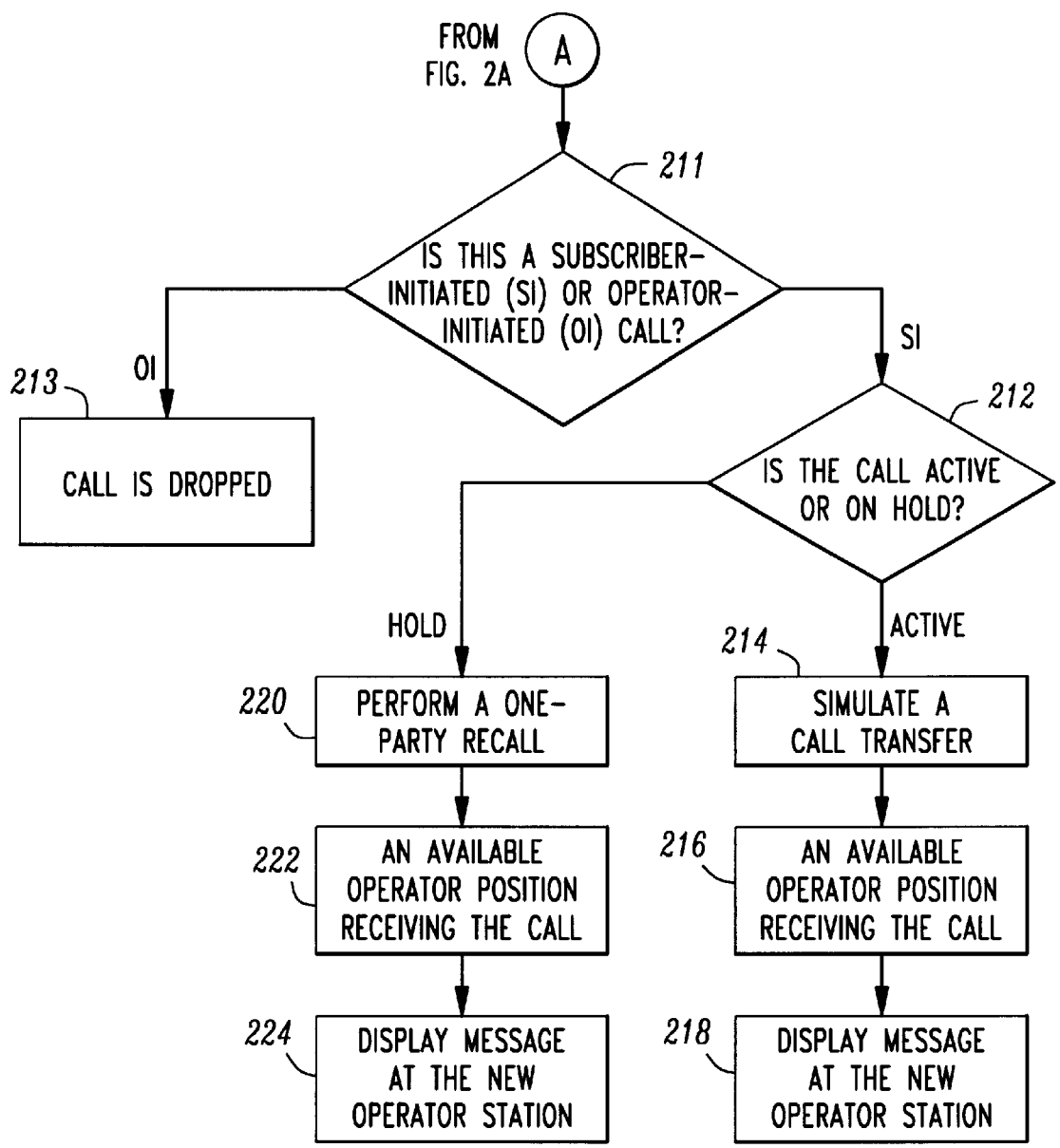

FIG. 1 is a block diagram of a telephone switching network 100. Telephone switching network 100 is a partial depiction of a portion of the public telephone switching network. Network 100 includes operator system 102 and offices 114. Offices 114 are switching systems that receive and switch telephone communication and provide ancillary services. System 102 and offices 114 are interconnected with trunks 1 18. A wide variety of trunks are employed for this function including SS7 (signaling system 7) trunks.

Operator system 102 is a switching system with operator stations for handling emergency phone calls. Operator system 102 includes a call position switching module (PSM) 104 with trunk interface units for receiving calls from other switching systems. Operator stations 1 12, which are preferably processorbased apparatus with a display device, are coupled to operator system 102 for voice and data communications and the display of information. System 102 is coupled to operator stations 112 via data links. An operator interacts with system 102 and telephone calls connected thereto by voice communication and entering key strokes. The key strokes are converted into commands that are sent over the data links to the hardware and software interfaces on system 102 that coordinate interaction with operator stations 112.

Call position switching module 104 receives, switches and transmits telephone calls over trunk interface 108. Most preferably, PSM 104 is a 5ESS®2000 switching module available from Lucent Technologies Inc. PSM 104 is programmable, including software and hardware components for operation. PSM 104 includes hardware and software interfaces for connecting to operator stations. PSM 104 performs local switching and control functions. Though one switching module is shown, multiple modules are alternatively employed for additional resources or to enhance reliability.

PSM 104 includes a processor 106 for executing software code, and a trunk interface unit 108. Though processor 106 is shown as a single processor block, processor 106 is alternatively, a single or multiple processors interconnected. Similarly, trunk interface unit 108 is shown as one block but may consist of multiple components or a single component capable of interfacing with multiple line and trunk physical devices. PSM 104 runs software programs in order to receive, switch and transmit telephone calls. PSM 104 switches and transfers emergency calls from failed operator stations to available operator stations after detecting position failures in accordance with the present invention. Preferably, an operator station is capable of handling multiple calls; therefore, multiple calls may be recovered when a position failure occurs at the operator station.

Figure 2C:
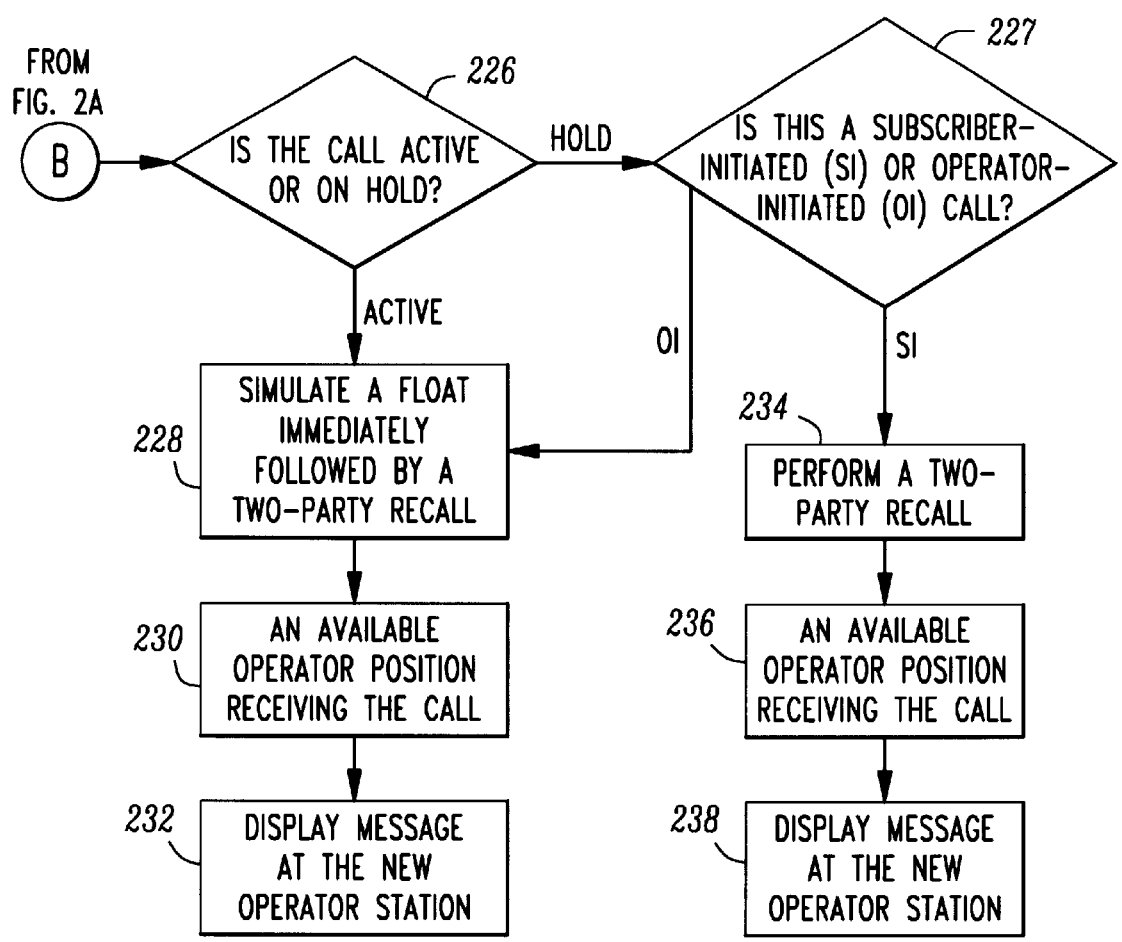

FIGS. 2A–C are flowcharts illustrating a preferred method in accordance with the present invention. FIGS. 2A–C are described below with reference to the preferred embodiment shown in FIG. 1.

FIGS. 2A–C illustrate a method to recover emergency calls at an operator station during a position failure in accordance with the present invention. First, an operator station receives a call that is placed through network 100 (200). If a position failure occurs at the operator station while the call is connected to an operator, the position failure at the operator station is detected (204). This is accomplished in the preferred embodiment through periodic test performed by call position switching module 104. For example, the call position switching module periodically checks that it is receiving valid data from the operator station.

After a position failure occurs, a determination is made as to whether the call is an emergency call (206). This is accomplished in the preferred embodiment by determining whether the called number represents an emergency number. This determination is preferably reflected in a data structure. Other designations indicating emergency calls are contemplated as well and may be tested. If the call is not an emergency call, then the call is dropped and the operator is logged off of the system (208).

If the call is an emergency call, then in accordance with the present invention, the call is automatically reassigned to an available operator station. In particular, a determination is made as to whether the call has extraneous connections (207). Extraneous connections are unnecessary or unwanted connections, for example, connections in addition to a connection to a caller and/or a second party. Preferably, the second party is an emergency authority (the caller being the first party). The extraneous connections may include the operator having connected the call to another operator or to a third party. If extraneous connections exist, then the extraneous connections are removed (209). This is accomplished in the preferred embodiment by releasing the extraneous connections from the operator station immediately after the system detects the extraneous connections.

After the extraneous connections, if any, are released, a determination is made as to whether the operator connected the emergency call to a second party (210). If the operator did not connect the emergency call to a second party, then a determination is made as to whether the call is a subscriber-initiated call or an operator-initiated call (211). A call is subscriber initiated when the caller initially places the call through the telephone network to the operator station. On the other hand, a call is operator initiated if the operator phones the subscriber, for example, after a previous call from the subscriber gets disconnected from the operator station, or goes on-hook. If the call is an operator-initiated call, then the call is dropped (213). If the call is a subscriber-initiated call, then a determination is made as to whether the emergency call is active or on hold (212). If the call is active, then a simulation of a call transfer is performed to transfer the call to an available operator station (214). This is accomplished in the preferred embodiment by simulating or emulating a predetermined sequence of keyed digits performed by the operator in a manual call transfer. Most preferably, the software interface that normally receives commands as a result of keys being depressed at the operator station, is made to receive commands as though the commands were generated by the operator station. In this manner, an interface to the operator station software interface is preserved. Additionally, some audits normally run in the operator station software interface to control interactions from the operator station are preserved.

Next, an available operator station receives the emergency call (216). In the preferred embodiment, the call is received at the available operator station as it was originally at the first operator station. For example, if the call is split (i.e., the operator is communicating with the second party without communicating to the caller) when the position failure occurred, then the call arrives at the available operator station split. Finally, a message is displayed at the new operator station, the message indicating that the emergency call received is due to a position failure at a previous operator station (218).

If the operator did not connect the emergency call to a second party (210) and the call is a subscriber-initiated call (211) that is on hold (212), then a oneparty recall is performed (220). This is accomplished in the preferred embodiment by switching the call from the failed operator station to an available operator station. The available operator station receives the emergency call (222). Finally, a message is displayed at the new operator station, the message indicating that the emergency call received is due to a position failure at a previous operator station (224).

If the operator did connect the emergency call to a second party (210), then a determination is made as to whether the emergency call is active or on hold (226). If the call is active, then a simulation of a float is performed immediately followed by a two-party recall (228). In the preferred embodiment, a float is simulated or emulated by repeating a predetermined sequence of steps manually performed by an operator when releasing emergency calls from the operator station. Most preferably, the software interface that normally receives manifestations of the operators manual commands is made to receive the commands from a software interface as though the commands were entered by the operator. As a result of the float, only the second party and the caller are connected to the emergency call. Then, the emergency call is switched from the failed operator station to an available operator station with the second party and the caller connected. The available operator station receives the emergency call (230). Finally, a message is displayed at the new operator station, the message indicating that the emergency call received is due to a position failure at a previous operator station (232).

If the operator did connect the emergency call to a second party (210) and the call is on hold (226), then a determination is made as to whether the call is a subscriber-initiated call or an operator-initiated call (227). If the holding call is a subscriber-initiated call, then a two-party recall is performed (234). This is accomplished in the preferred embodiment by switching the emergency call from the failed operator station to an available operator station with the second party and the caller connected. The available operator station receives the emergency call (236). Finally, a message is displayed at the new operator station, the message indicating that the emergency call received is due to a position failure at a previous operator station (238).

If the operator did connect the emergency call to a second party (210) and the holding call is an operator-initiated call (227), then a simulation of a float is performed immediately followed by a two-party recall (228). Then, the emergency call is switched from the failed operator station to an available operator station with the second party and the caller connected. The available operator station receives the emergency call (230). Finally, a message is displayed at the new operator station, the message indicating that the emergency call received is due to a position failure at a previous operator station (232).

The present invention provides for the recovery of emergency calls at a failed operator position station. The switching system switches and transfers emergency calls to available operator stations immediately after position failures are detected. Advantageously, this invention provides a more reliable method to handle emergency calls.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. A method for recovering emergency calls at an operator station during a position failure, the method comprising the steps of:
   A) receiving a call at a first operator station;
   B) detecting a system failure at the first operator station;
   C) determining whether the call is an emergency call;
   D) if the call is an emergency call, then determining a status of the call; and
   E) connecting the call to a second operator station based on the status.

2. The method of claim 1 wherein the step of determining whether the call is an emergency call comprises determining whether the call has a predetermined sequence of called digits associated with emergency calls.

3. The method of claim 1 wherein the step of determining the status of the call comprises the step of determining whether the call has extraneous connections.

4. The method of claim 3 wherein if the call has extraneous connections, then removing the extraneous connections by releasing the connections from the operator station.

5. The method of claim 3 wherein the step of determining the status of the call further comprises the steps of:
   D1) determining whether an operator connected the call to a second party;
   D2) determining whether the call is a subscriber-initiated call or an operator-initiated call; and
   D3) determining whether the call is in a hold position or an active position at the first operator station.

6. The method of claim 5 wherein the second party is an emergency authority.

7. The method of claim 5 wherein if the call is not connected to the second party and the call is an operator-initiated call, then dropping the call from the operator station.

8. The method of claim 5 wherein if the call is not connected to the second party and the call is a subscriber-initiated call that is in the hold position at the first operator station, then switching the call from the first operator station to the second operator station.

9. The method of claim 8 wherein switching the call from the first operator station to the second operator station comprises executing a one-party recall.

10. The method of claim 5 wherein if the call is not connected to the second party and the call is a subscriber-initiated call that is in the active position at the first operator station, then executing a call transfer.

11. The method of claim 10 wherein the step of executing the call transfer comprises the step of simulating a predetermined sequence of keyed digits used to perform a manual call transfer.

12. The method of claim 5 wherein if the call is connected to the second party and the call is a subscriber-initiated call that is in the hold position at the first operator station, then executing a two-party recall.

13. The method of claim 12 wherein the step of executing the two-party recall comprises the step of switching the call from the first operator station to the second operator station.

14. The method of claim 5 wherein if the call is connected to the second party and the call is an operator-initiated call that is in the hold position at the first operator station, then executing a float and a two-party recall.

15. The method of claim 14 wherein the step of executing the float comprises the step of simulating a predetermined sequence of steps that an operator manually performs to release the call from the first operator station.

16. The method of claim 15 wherein the step of executing the two-party recall comprises the step of switching the call from the first operator station to the second operator station.

17. The method of claim 5 wherein if the call is connected to the second party and the call is in the active position at the first operator station, then executing a float and a two-party recall.

18. The method of claim 17 wherein the step of executing the float comprises the step of simulating a predetermined sequence of steps that an operator manually performs to release the call from the first operator station.

19. The method of claim 18 wherein the step of executing the two-party recall comprises the step of switching the call from the first operator station to the second operator station.

20. The method of claim 1 further comprising the step of displaying a message at the second operator station, wherein the message indicates that the call received is due to a position failure at the first operator station.

21. A system for recovering emergency telephone calls, the system comprising:
   a first operator station;
   a second operator station;
   a switching system coupled to the first operator station and the second operator station;
   wherein the first operator station receives a call; and
   wherein the switching system:
      detects a failure with the first operator station;
      determines whether the call is an emergency call;
      determines a status of the call; and
      connects the call to the second operator station if the call is an emergency call.

22. The system of claim 21 wherein the switching system determines whether the call is an emergency call by determining whether the call has a predetermined sequence of called digits associated with emergency calls.

23. The system of claim 21 wherein the status of the call includes whether the call is operator initiated or subscriber initiated.

24. The system of claim 23 wherein the status of the call further includes whether the call is connected to a party in addition to a caller and an operator.

25. The system of claim 21 wherein the switching system connects the call by performing one of a one-party recall, a two-party recall, and a call transfer.

26. The system of claim 21 wherein the second operator station displays a message indicating the call was transferred from the first operator station.

27. A telephone switching system comprising:

a first operator station;

a second operator station;

means for receiving a call at the first operator station;

means for detecting a failure at the first operator station;

means for determining whether the call is an emergency call;

means for determining the status of the call; and means for connecting the call to the second operator station if the call is an emergency call.

28. The system of claim 27 wherein the means for determining whether the call is an emergency call determines whether the call is an emergency call by determining whether the call has a predetermined sequence of called digits associated with emergency calls.

29. The system of claim 28 wherein the status of the call includes whether the call is operator initiated or subscriber initiated.

30. The system of claim 29 wherein the status of the call further includes whether the call is connected to a party in addition to a caller and an operator.

31. The system of claim 30 wherein the means for connecting connects the call by performing one of a one-party recall, a two-party recall, and a call transfer.

32. The system of claim 31 wherein the second operator station displays a message indicating the call was transferred from the first operator station.

* * * * *